United States Patent
Gur et al.

(10) Patent No.: US 12,022,535 B2
(45) Date of Patent: Jun. 25, 2024

(54) ELECTRONIC DEVICE PAIRING

(71) Applicant: Microsoft Technology Licensing, LLC, Redmond, WA (US)

(72) Inventors: Arie Yehuda Gur, Kiryat Ono (IL); Nadav Linenberg, Even Yehuda (IL); Eran Chencinski, Giv'at Shmuel (IL); Uri Ron, Kfar Saba (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/212,979

(22) Filed: Mar. 25, 2021

(65) Prior Publication Data

US 2022/0312508 A1 Sep. 29, 2022

(51) Int. Cl.
*H04W 76/10* (2018.01)
*H04L 67/141* (2022.01)

(52) U.S. Cl.
CPC ........... *H04W 76/10* (2018.02); *H04L 67/141* (2013.01)

(58) Field of Classification Search
CPC .. H04W 76/10; H04L 67/141; G06F 3/03545; G06F 3/04162
USPC ........................................................ 709/227
See application file for complete search history.

(56) References Cited

U.S. PATENT DOCUMENTS

| | | | |
|---|---|---|---|
| 10,496,872 B2 | 12/2019 | Holden et al. | |
| 10,564,741 B2 | 2/2020 | Dekel | |
| 10,719,145 B1 * | 7/2020 | Files | G06F 1/169 |
| 10,719,148 B2 * | 7/2020 | Gilbert | H04W 12/108 |
| 10,838,502 B2 | 11/2020 | Hastings et al. | |
| 10,969,901 B2 * | 4/2021 | Konda | G06F 3/0383 |
| 10,986,451 B2 * | 4/2021 | Ungstrup | H04R 25/305 |
| 2006/0183505 A1 | 8/2006 | Willrich et al. | |

(Continued)

FOREIGN PATENT DOCUMENTS

| | | |
|---|---|---|
| EP | 2637098 A1 | 9/2013 |
| EP | 3295283 A1 | 3/2018 |

OTHER PUBLICATIONS

Arora, Akhil, "Wacom Unveils Surface Pen-Like Stylus for Windows 2-in-1 devices at CES 2016", Retrieved from ntttps://web.archive.org/web/20160107095118/https:/gadgets.ndtv.com/tablets/news/wacom-unveils-surface-pen-like-stylus-for-windows-2-in-1-devices-at-ces-2016-786738, Jan. 7, 2016, 5 Pages.

(Continued)

*Primary Examiner* — Mohamed A. Wasel
*Assistant Examiner* — Tesfu N Mekonen
(74) *Attorney, Agent, or Firm* — Alleman Hall & Tuttle LLP (57) ABSTRACT

A computing device comprises a logic subsystem and a storage subsystem holding instructions executable by the logic subsystem to transmit a first identifier of the computing device to a separate electronic device, the first identifier being transmitted during one time frame of a plurality of sequential time frames. A second identifier of the computing device is transmitted to the electronic device, the second identifier including more data than the first identifier, the second identifier being transmitted over two or more time frames of the plurality of sequential time frames. An electronic pairing is established between the computing device and the electronic device based at least in part on one or both of the first and second identifiers, the electronic pairing enabling receiving of control inputs from the electronic device at the computing device.

15 Claims, 6 Drawing Sheets

(56) References Cited

U.S. PATENT DOCUMENTS

| | | | |
|---|---|---|---|
| 2016/0077784 A1* | 3/2016 | Yamada | G06F 3/0321 |
| | | | 345/2.3 |
| 2017/0262084 A1 | 9/2017 | Qiao | |
| 2017/0289744 A1* | 10/2017 | Li | H04L 67/303 |
| 2018/0113519 A1* | 4/2018 | Yamamoto | G06F 3/03545 |
| 2018/0164905 A1* | 6/2018 | Yamamoto | G06F 3/0383 |
| 2019/0121453 A1 | 4/2019 | Dekel | |
| 2019/0196631 A1* | 6/2019 | Li | G06F 3/0412 |
| 2020/0103988 A1* | 4/2020 | Jeon | G06F 3/04162 |
| 2020/0174589 A1* | 6/2020 | Hara | G06F 3/04162 |
| 2021/0208759 A1* | 7/2021 | Konda | G06F 3/0383 |
| 2021/0223875 A1* | 7/2021 | Nomura | G06F 3/04162 |
| 2021/0377726 A1* | 12/2021 | Finney | H04W 12/71 |

OTHER PUBLICATIONS

"International Search Report and Written Opinion Issued in PCT Application No. PCT/US22/017786", dated May 11, 2022, 11 Pages.

* cited by examiner

```
┌─────────────────────────────────────────────────────────────┐
│  RECEIVE, FROM A COMPUTING DEVICE, A FIRST IDENTIFIER OF THE │
│                    COMPUTING DEVICE                          │
│                                                         502  │
└─────────────────────────────────────────────────────────────┘
                              │
                              ▼
┌─────────────────────────────────────────────────────────────┐
│ RECEIVE, FROM THE COMPUTING DEVICE, A SECOND IDENTIFIER OF   │
│                    THE COMPUTING DEVICE                      │
│                                                         504  │
└─────────────────────────────────────────────────────────────┘
                              │
                              ▼
┌ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┐
   ESTABLISH AN ELECTRONIC PAIRING BETWEEN THE ELECTRONIC
│  DEVICE AND THE COMPUTING DEVICE BASED AT LEAST IN PART ON ONE │
     OR BOTH OF THE FIRST AND SECOND IDENTIFIERS
│                                                        506  │
└ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┘
```

ELECTRONIC DEVICE PAIRING

BACKGROUND

Computing devices may be configured to electronically "pair" with one or more other electronic devices—e.g., electronic accessories such as styluses, mice, and keyboards. By pairing with an electronic device, a computing device may establish a unidirectional or bidirectional communications channel over which one device may send data to another. For example, operation of the computing device may be controlled by a paired accessory, or an accessory may play media originating from the computing device.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

A computing device comprises a logic subsystem and a storage subsystem holding instructions executable by the logic subsystem to transmit a first identifier of the computing device to a separate electronic device, the first identifier being transmitted during one time frame of a plurality of sequential time frames. A second identifier of the computing device is transmitted to the electronic device, the second identifier including more data than the first identifier, the second identifier being transmitted over two or more time frames of the plurality of sequential time frames. An electronic pairing is established between the computing device and the electronic device based at least in part on one or both of the first and second identifiers, the electronic pairing enabling receiving of control inputs from the electronic device at the computing device.

DETAILED DESCRIPTION

As discussed above, electronic pairing of a computing device with a separate electronic device may be used to establish a unidirectional or bidirectional channel over which one device may send data to another. For example, a computing device that includes a touch-sensitive display may pair with an electronic device taking the form of an active stylus. In this manner, the stylus may control operation of the computing device—for example, the stylus may include a physical button that, when actuated, causes the computing device to launch a corresponding application. Similarly, the stylus may provide touch or hover inputs to the touch-sensitive display—e.g., to interact with software interfaces, to draw lines or shapes—while the computing device controls haptic feedback functionality of the stylus. Notably, because the computing device and the stylus are paired, actuation of the button will typically cause only the paired computing device to respond, and not any other nearby computing devices. This may help to reduce the risk that a user inadvertently uses an electronic device (e.g., stylus) to control one or more unintended computing devices—e.g., computing devices belonging to other users.

In a common scenario, a user may use the same electronic device (e.g., stylus) with multiple different host computing devices (e.g., touch-sensitive display devices) at different times. For example, the user may use a stylus with their own computer, a coworker's computer, a shared office computer, etc. In various cases, the user may prefer to use substantially similar settings—e.g., relating to haptic feedback behavior, or a preferred color to be used with touch "ink" inputs—regardless of the host computing device that the user is interacting with. In other cases, the user may prefer to use different settings profiles depending on the current host computing device they are using. In any case, however, it is generally desirable to establish the pairing relationship as quickly as possible—e.g., to reduce the amount of time in which the user's preferred settings are not applied, or to reduce the amount of time in which the user's control inputs cause an unintended device to respond.

In some cases, pairing a computing device with a separate electronic device may require manual effort on the part of the user—e.g., the user may be required to manually interact with physical or software-based connection settings of the computing device and/or electronic device to establish a pairing. Even in cases where automatic pairing is possible, there will inherently be some amount of latency associated with pairing a computing device with a separate electronic device, and such latency can be distracting or disruptive. In one example scenario, a user may use an electronic device (e.g., an active stylus) to control a first computing device (e.g., a first tablet), then move the electronic device to a second computing device (e.g., a second tablet belonging to a different user), intending to use their stylus to control the second tablet. While the second tablet may automatically pair with the user's stylus, there may still be a noticeable latency period during which the stylus and second tablet are not paired, and thus the stylus for a time may not provide the correct haptic feedback, or not cause use of a desired inking color, as examples. Furthermore, during this latency interval, the stylus may still be paired with the first tablet, and thus any control inputs originating from the stylus may cause the first tablet to respond. For example, the user may press a button on the stylus intending to launch an application on the second tablet, only for the first tablet to respond.

Accordingly, the present disclosure is directed to techniques for establishing electronic pairings between a computing device and a separate electronic device in a manner that, in some scenarios, reduces an associated pairing latency. Specifically, according to the present disclosure, a computing device and electronic device may pair based at least in part on one or both of a first identifier and a second identifier transmitted by the computing device. The first identifier may beneficially include a smaller amount of total data than the second identifier, and therefore may be transmitted in a shorter length of time. Thus, in some cases, the electronic device may pair with the computing device after only receiving the first identifier, thereby reducing the amount of latency experienced by a user of the computing device during pairing. The second identifier, while transmitted over a longer length of time, may be used to confirm that the electronic device has paired with the correct computing device. In this manner, faster and more efficient pairing of computing devices with separate electronic devices may be achieved, while mitigating the risk of incorrect pairings.

Figure 1:
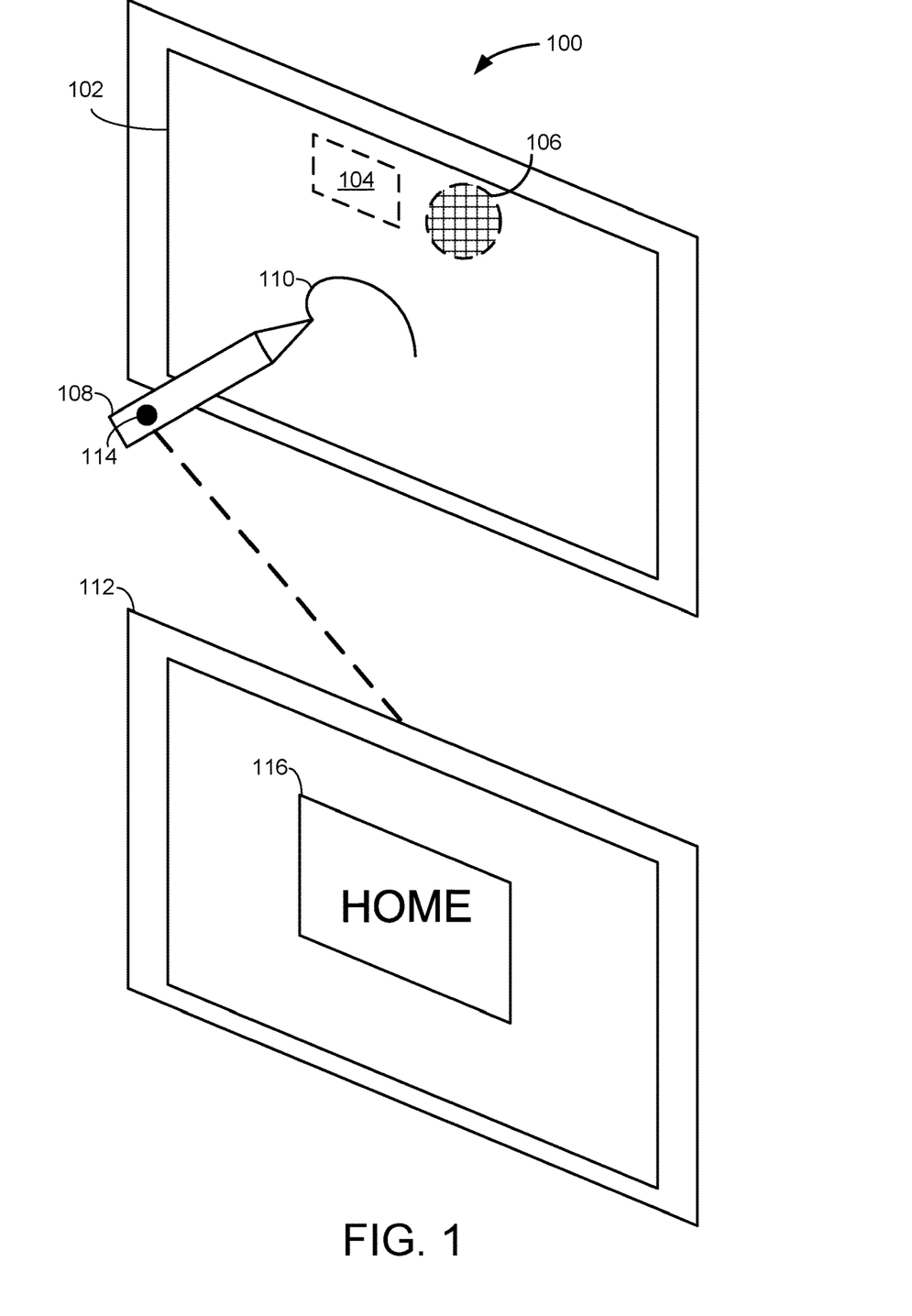
FIG. 1 schematically shows two different computing devices and an example electronic device.

FIG. 1 schematically shows an example first computing device 100, including a touch-sensitive display 102. Both the touch-sensitive display 102 and computing device 100 may have any suitable size and dimensions. In some examples, a computing device may include more than one touch-sensitive display. For example, a computing device as described herein may refer to a device having two or more touch-sensitive displays in a foldable or static configuration, as well as single-display devices such as display device 100. Alternatively, computing devices need not include touch-sensitive displays, but rather may have any suitable form factor and include any suitable combination of computer hardware. As non-limiting examples, computing devices can include desktop computers, laptops, smartphones, tablets, mixed reality devices, fitness devices (e.g., smartwatches), media center devices, automotive computing devices, etc. In some cases, a "computing device" as described herein may be implemented as computing system 700 described below with respect to FIG. 7.

It will be understood that the devices and components depicted in FIG. 1 are simplified and schematic in nature. In practical examples, computing devices and separate electronic devices may include additional or alternative components to those described herein, may have any suitable shapes, sizes, and form factors, and may have any suitable capabilities.

Computing device 100 includes a controller 104 configured to perform one or more of the computing functions described herein. For example, as will be described in more detail below, controller 104 may be configured to transmit identifiers of the computing device to a separate electronic device, and thereby establish an electronic pairing with the separate electronic device. In some examples, the controller may include one or more computer processors, or other suitable logic hardware, working in tandem with one or more volatile or non-volatile data storage devices, or other suitable storage hardware. In some examples, controller 104 may be implemented via logic subsystem 702 and storage subsystem 704 described below with respect to FIG. 7.

Touch-sensitive display 102 includes a plurality of display electrodes, including electrodes 106, which may be configured to detect proximity of input objects to the touch-sensitive display. Input objects may include, as examples, human fingers, passive styluses, active styluses, and other suitable electronic devices or non-electronic objects. For example, the display electrodes may detect a change in capacitance caused by proximity of an input object to the display surface. By monitoring electrical conditions at the plurality of display electrodes, controller 104 may determine the two-dimensional position of the touch input relative to the surface of the display. Display electrodes 106 and controller 104 are shown with dashed lines to indicate that they are disposed beneath the display surface and would not ordinarily be visible from the illustrated perspective.

In FIG. 1, a separate electronic device 108 is contacting the surface of touch-sensitive display 102. In this example, the electronic device takes the form of an active stylus. Based at least in part on the contact between the stylus and the display, the computing device is rendering visual content 110, taking the form of a line that reflects movement of the electronic device relative to the surface of the display over a particular window of time. It will be understood, however, that electronic device 108 is a non-limiting example, and that an "electronic device" as described herein need not take the form of a stylus. Rather, electronic devices may include, as non-limiting examples: styluses, computer mice, keyboards, media playback devices (e.g., speakers, headphones), media capture devices (e.g., cameras, microphones), control devices (e.g., remote controls, video game controllers, control dials), sensors, and IoT (Internet of Things) devices.

In FIG. 1, while electronic device 108 is contacting computing device 100, the electronic device has not yet been paired with computing device 100. Rather, electronic device 108 is still electronically paired with a second computing device 112, having a similar appearance and form factor to computing device 100. This is indicated by the dashed line extending between the electronic device and second computing device 112.

For example, electronic device 108 may have recently been used to control second computing device 112, but a user of the electronic device is now attempting to control computing device 100. Due to pairing latency between electronic device 108 and computing device 100, any control inputs originating from electronic device 108 may be received and acted upon by computing device 112, rather than computing device 100, which can be distracting and disruptive for the user. In the example of FIG. 1, electronic device 108 includes a physical button 114 that, when actuated, causes launch of a "home" interface on whichever computing device it is currently paired with. In this case, though electronic device 108 is contacting computing device 100, actuation of button 114 causes display of home interface 116 on second computing device 112, which may be contrary to what the user intends. Similarly, because electronic device 108 is not paired with computing device 112, the computing device may apply settings that conflict with what the user expects or intends. For example, the computing device may use the wrong color to represent touch "ink" inputs, or the computing device may fail to cause electronic device 108 to provide correct haptic feedback, for the duration of the pairing latency interval.

Figure 2:
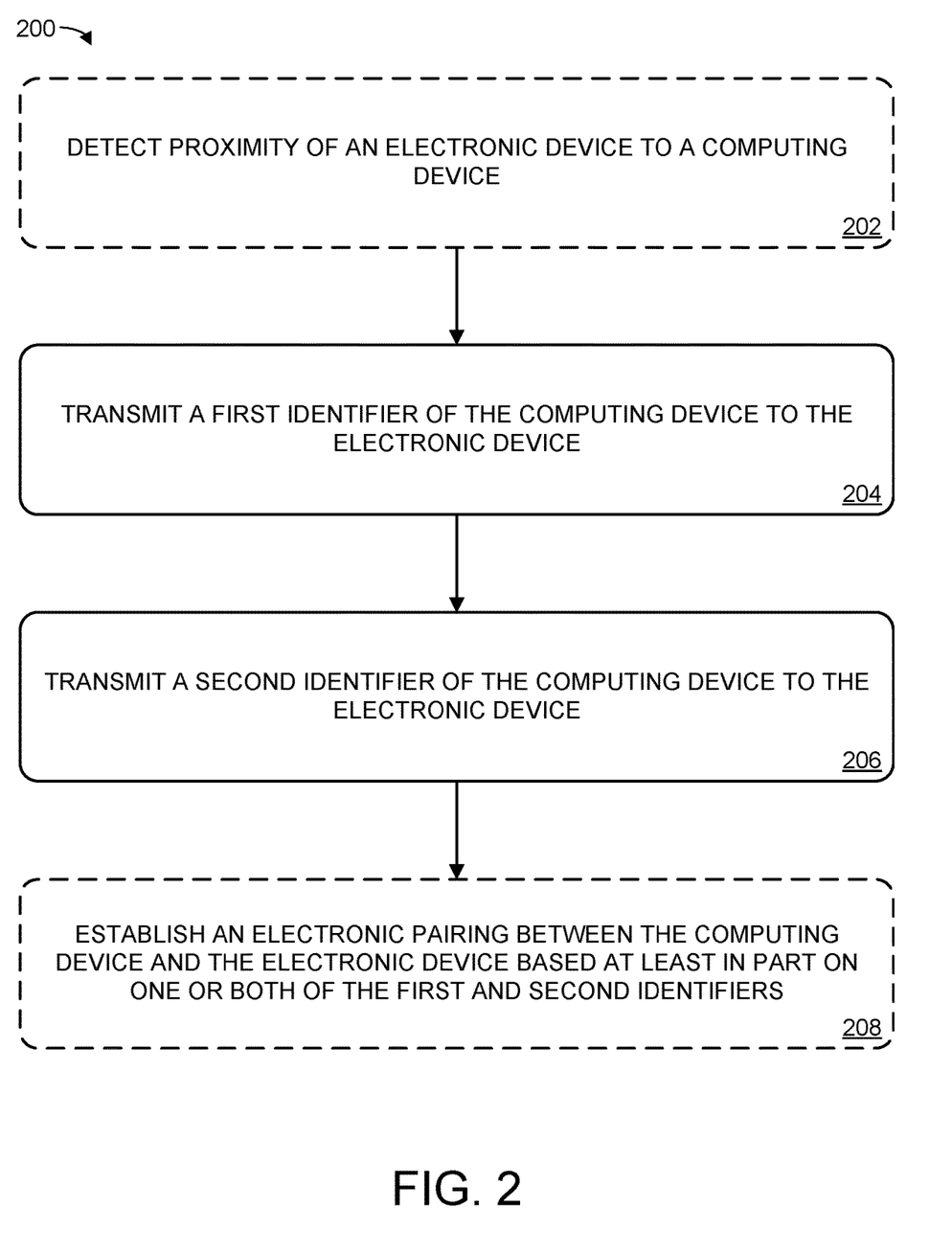
FIG. 2 illustrates an example method for electronic device pairing.

Accordingly, FIG. 2 illustrates an example method 200 for electronic device pairing that may reduce the latency interval associated with pairing an electronic device with a computing device. Method 200 may be implemented by any suitable computing system of one or more computing devices, particularly when pairing with a separate electronic device. Devices implementing method 200 may have any suitable capabilities, hardware configuration, and form factor. As non-limiting examples, method 200 may be implemented by either or both of computing devices 100 and 112 of FIG. 1, and/or computing system 700 described below with respect to FIG. 7.

At 202, method 200 optionally includes detecting proximity of an electronic device to a computing device. This may be done in various suitable ways. As discussed above, the computing device may in some cases include a touch-sensitive display. The touch-sensitive display may detect proximity of input objects, including electronic devices, in any suitable way and utilizing any suitable touch-sensing and/or hover-sensing technologies. For example, the touch-sensitive display device may use a suitable capacitive touch sensor—e.g., relying on mutual capacitance or self-capacitance—although non-capacitive technologies may alternatively be used. In general, detecting the proximity of the electronic device to the computing device may include detecting a change in electrostatic properties of the touch-sensitive display consistent with proximity of the electronic device—e.g., due to contact or close proximity between the electronic device and touch-sensitive display. This change in electrostatic properties may in some cases be influenced by active signals emitted by the electronic device—e.g., in the case of an active stylus—or the change in electrostatic properties may be substantially due to physical presence of the electronic device near the display.

It will be understood, however, that a computing device need not include a touch-sensitive display device, and thus the presence of an electronic device in proximity to the computing device may be detected in any variety of suitable ways. In general, detecting the proximity of the electronic device may include detecting signals emitted by the electronic device, and/or utilizing one or more suitable sensors of the computing device (e.g., cameras, magnetometers, wireless communications interfaces).

In some cases, only transmitting one or more identifiers of the computing device in response to detecting proximity of an electronic device can conserve electrical power of the computing device. For instance, the computing device may consume electrical power each time an identifier is transmitted, and thus power may be conserved by only transmitting an identifier when an electronic device is detected. Furthermore, although the present disclosure has primarily focused on a scenario in which proximity of the electronic device is detected prior to other steps of method 200, it will be understood that this need not always be the case. Rather, as will be discussed in more detail below, in some cases the computing device may be configured to transmit one or more identifiers regardless of the proximity of any separate electronic devices to the computing device. In such cases, though additional power may be consumed, it may improve the speed and reliability with which electronic devices may be paired, in the event that an electronic device is present but not detected by the computing device.

Continuing with FIG. 2, at 204, method 200 includes transmitting a first identifier of the computing device to the electronic device. This is schematically illustrated with respect to FIG. 3, again showing computing device 100 and electronic device 108. As shown, computing device 100 transmits a first identifier 300 to electronic device 108, where it is received by a controller 302 of electronic device 108. As with controller 104, controller 302 may take the form of any suitable computer logic componentry, working in tandem with any suitable data storage componentry. As one example, controller 302 may be implemented via logic subsystem 702 and storage subsystem 704 described below with respect to FIG. 7.

Figure 3:
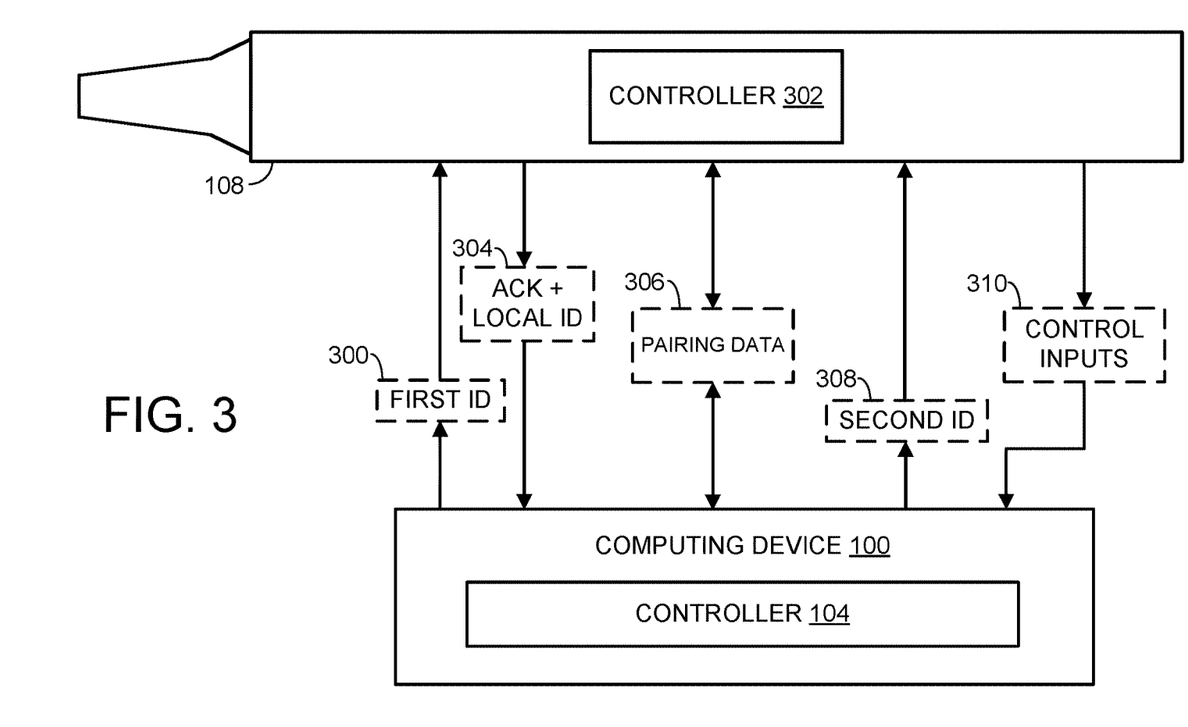
FIG. 3 schematically illustrates exchange of data between a computing device an electronic device during pairing.

First identifier 300 may take any suitable form. In general, the first identifier may take the form of one or more values that identify the computing device, although the first identifier need not always be a unique identifier of the computing device. For instance, in one example, the first identifier may take the form of a 10-bit value, and there may therefore be 1024 different possible values of the first identifier. Use of a 10-bit value may beneficially enable transmission of the first identifier during a single time frame, while still providing enough uniqueness to reduce the risk that any two given computing devices will happen to share the same first identifier. In some cases, the size of the first identifier may vary from implementation to implementation, depending on the communications bandwidth between the computing device and electronic device. For example, as will be described in more detail below, the first identifier may beneficially be transmitted to the electronic device relatively quickly—e.g., within one time frame, as compared to multiple time frames for the second identifier. Thus, the amount of data included as part of the first identifier may be tuned depending on the implementation, in order to facilitate relatively fast transmission of the first identifier.

In some examples, the first identifier for any given computing device may remain fixed over time, to enable fast pairing with previously-paired electronic devices. For example, the first identifier may be generated upon initial manufacture or activation of the computing device. In other examples, however, the first identifier may change one or more times over the lifecycle of the computing device—e.g., if the operating system of the computing device is reinstalled, or ownership of the computing device is transferred to a different party. When the first identifier is first generated, in some cases a randomization function may be used to ensure that different possible values of the first identifier are approximately evenly distributed between different computing devices. This can reduce the risk that any two particular computing devices have the same first identifier.

The first identifier may be transmitted from the computing device to the electronic device in any suitable way. In some cases, the first identifier may be transmitted electrostatically. As discussed above, the computing device may in some cases include a touch-sensitive display that in turn includes a plurality of display electrodes. Such display electrodes may be driven with different signals, thereby producing an electrostatic effect that is detectable at the electronic device. In some cases, the signals supplied to the display electrodes of the touch-sensitive display may be modulated in such a manner as to encode the first identifier. Thus, when the electrostatic signals are detected at the electronic device, the first identifier may be decoded and interpreted.

In other examples, however, the first identifier may be transmitted in other suitable ways, particularly in examples where the computing device does not include a touch-sensitive display. For example, the first identifier may be transmitted via a suitable wireless communications interface of the computing device, which may broadcast the first identifier to any or all devices in the same local environment. As one example, the first identifier may be transmitted via Bluetooth, or a different suitable radio frequency (RF) communications protocol.

The first identifier may be transmitted at any suitable time and for any suitable reason. In one example, as discussed above, the first identifier may be transmitted in response to detecting the proximity of the electronic device to the computing device. In other words, upon detecting presence of the electronic device (e.g., via a change in electrostatic properties at a touch-sensitive display), the computing device may transmit the first identifier one or more times for detection at the electronic device.

In other examples, however, the first identifier may be transmitted regardless of proximity of the electronic device to the computing device. For example, the computing device may be configured to repeatedly transmit the first identifier even when no nearby electronic devices are detected. As discussed above, although this may cause more electrical power may be consumed, it can improve the speed and reliability with which electronic devices are paired, in the event that any particular electronic device is proximate to the computing device but is not detected. In the event that a nearby electronic device does receive the first identifier, repeated transmission of the first identifier by the computing device may be discontinued. For example, the computing device may receive an acknowledgement from the electronic device confirming receipt of the first identifier, and the computing device may discontinue repeated transmission of the first identifier when the acknowledgement is received. This is schematically illustrated in FIG. 3, in which computing device 100 receives a first acknowledgement 304 from electronic device 108, confirming that the electronic device received first identifier 300.

In FIG. 3, the computing device also receives a local identifier of the electronic device along with acknowledgement 304. The local identifier may, for example, be a value or set of values useable by the computing device to identify the electronic device—e.g., in the case that the computing device and electronic device have previously been paired, the local identifier may have been assigned to the electronic device by the computing device. In some examples, the computing device may maintain a settings profile associated with the local identifier such that, upon receiving the local identifier from an electronic device, the computing device may apply various settings specific for the electronic device. As examples, this can include instructions for providing different types of haptic feedback, or instructions for using a desired color to represent touch "ink" inputs.

FIG. 3 also schematically depicts the computing device and electronic device exchanging pairing data 306. This may include virtually any suitable data that may be exchanged between a computing device and separate electronic device during pairing. As one example, the device data may include a second, longer identifier of the electronic device. For example, the local identifier described above may be a relatively short identifier that can be transmitted relatively quickly, but does not uniquely identify the electronic device. By contrast, pairing data 306 may include a full unique identifier of the electronic device that takes relatively longer to transmit. As additional examples, pairing data 306 may specify capabilities of the electronic device and/or computing device, include information regarding a registered user of the electronic device and/or computing device, include information regarding other communication channels over which the devices may communicate, include instructions on applying certain settings specified by one device or the other (e.g., relating to haptic feedback, ink color), etc. Furthermore, it will be understood that the specific format and contents of pairing data 306 will depend on the specific communications protocol used for the data exchange. For example, device pairing may in some cases occur via Bluetooth, in which case the pairing data exchanged will be specific to the Bluetooth communications protocol. In other examples, pairing data may be transmitted over a different suitable RF channel, and/or electrostatically.

It will be understood that pairing data 306 may be transmitted over any suitable window of time. FIG. 3 depicts the exchange of pairing data beginning after the first identifier is transmitted and finishing before the second identifier is transmitted. It will be understood, however, that pairing data may continue to be exchanged both during and after the second identifier is transmitted.

As discussed above, the first identifier is beneficially transmitted to the electronic device over a relatively short amount of time. This may reduce the latency interval associated with pairing the computing device with the electronic device, in the event that the devices are able to pair based only on the first identifier. In one example, the first identifier may be transmitted during one time frame of a plurality of sequential time frames of the computing device. Such time frames may, for example, correspond to a display refresh rate of the computing device. Thus, using an example refresh rate of 60 frames-per-second (FPS), the first identifier may be transmitted in approximately 17 ms, which may be sufficiently fast to prevent a human user from perceiving significant pairing latency between the computing device and electronic device.

Figure 4:
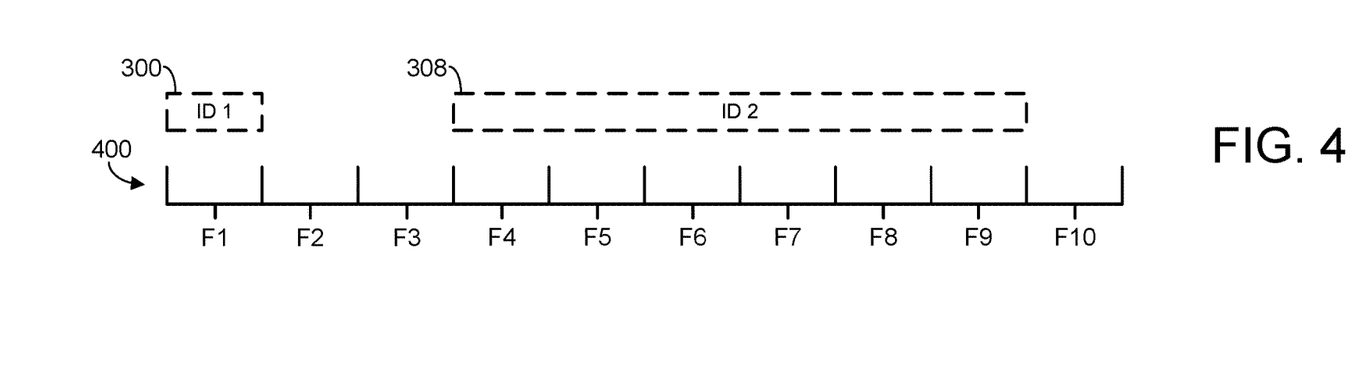
FIG. 4 schematically illustrates transmission of identifiers of a computing device during different frames of a plurality of sequential frames.

This is schematically illustrated with respect to FIG. 4, showing an example plurality of sequential time frames 400, including frames F1-F10. Each frame may have any suitable duration. As discussed above, when the framerate is 60 FPS, each individual time frame may have a duration of approximately 17 ms, although other suitable refresh rates may be used, in which case each time frame may have a different duration. As shown, in FIG. 4, transmission of first identifier 300 occurs entirely during a first-time frame F1.

In some cases, transmission of the first identifier may be done with relatively high priority. For example, the computing device may reserve some portion of each time frame for electrostatic communication with any separate electronic devices, while other portions of the time frame are used for other operations related to activity of a touch-sensitive display. Thus, transmission of the first identifier may in some cases take place at the beginning of the time frame. Additionally, or alternatively, the transmission of the first identifier may take place at the beginning of a window within the time frame reserved for communications with separate electronic devices.

It will be understood that, while the example of a touch-sensitive display device is used, "time frames" as used herein need not always refer to the refresh rate of a display device. In general, any given increment of time (e.g., one second) may be divided into any number of different time frames depending on the implementation, and transmission of a first identifier may take place over any suitable number of such time frames. However, as discussed above, the first identifier may beneficially be transmitted over a relatively short window of time as compared to transmission of a second identifier, which may enable relatively fast pairing between the computing device and separate electronic device.

Returning briefly to FIG. 2, at 206, method 200 includes transmitting a second identifier of the computing device to the electronic device. Notably, the second identifier may include relatively more data than the first identifier, and may be transmitted over two or more time frames of the plurality of sequential time frames.

This is schematically illustrated with respect to FIG. 3. As shown, computing device 100 transmits a second identifier 308 to electronic device 108. As with the first identifier, the second identifier may take any suitable form. Again, the second identifier may take the form of one or more values that identify the computing device. In the case of the second identifier, however, the second identifier may be a unique identifier of the computing device. In other words, the second identifier may have sufficient length that no two computing devices share the same second identifier. This stands in contrast to the first identifier which, as described above, need not always be a unique identifier of the computing device. Thus, the length of the second identifier may be set such that it serves as a unique identifier of the computing device.

Furthermore, because the second identifier includes more data than the first identifier, it may be transmitted over a relatively longer period of time—e.g., two or more time frames, as opposed to one time frame for the first identifier. This is schematically illustrated with respect to FIG. 4. In this example, second identifier 308 is transmitted over the course of six time frames, including frames F4-F9. In other words, some portion of the second identifier may be transmitted on each frame, beginning with frame F4 and ending with frame F9. As such, when each time frame has a duration of 17 ms, transmission of the second identifier may take approximately 100 ms. In other examples, however, the second identifier may be transmitted over any suitable number of time frames, depending on the length of the second identifier, the duration of each time frame, and the communications bandwidth available during each time frame.

In the example of FIG. 4, there is a gap of two frames between transmission of the first identifier and transmission of the second identifier. It will be understood that this is not limiting, and that there may be any suitable gap between transmission of the first and second identifiers. In other examples, there may be substantially no gap between transmission of the first and second identifiers—rather, transmission of the second identifier may begin on the first frame after transmission of the first identifier.

After transmitting the second identifier, the computing device may in some cases receive an acknowledgement from the electronic device confirming receipt of the second identifier. This may in some cases cause the computing device to discontinue transmission of the second identifier—e.g., in cases where the second identifier is transmitted repeatedly.

Returning briefly to FIG. 2, at 208, method 200 includes establishing an electronic pairing between the computing device and the electronic device based at least in part on one or both of the first and second identifiers. Specifically, the electronic pairing enables receiving of control inputs from the electronic device at the computing device. As discussed above, in some cases the exchange of pairing data may begin after the first identifier is transmitted but before the second identifier is transmitted, and continue both during and after transmission of the second identifier. Thus, it will be understood that step 208 may begin either before or after step 206 of method 200. In other words, the computing device and electronic device may be paired based at least in part on one or both of the first and second identifiers. Thus, in some cases, the electronic pairing between the computing device and the electronic device may be established after transmitting the first identifier, and while at least a portion of the second identifier has yet to be transmitted. This may be possible when, for example, the computing device has previously been paired with the electronic device.

As will be described in more detail below, the electronic device may in some cases maintain a stored table including prior identifiers for any prior computing devices that the electronic device has previously been paired with. Thus, upon receiving a first identifier (e.g., first identifier 300) that is already held in the stored table, the electronic device may attempt to pair with the computing device based at least in part on the first identifier. Furthermore, as discussed above, pairing after transmission of the first identifier, but before full transmission of the second identifier, may beneficially reduce the latency interval associated with pairing an electronic device with a computing device. This can reduce the risk that the electronic device will transmit control inputs during the latency interval, thus causing such control inputs to be fulfilled by an unintended computing device.

In some cases, however, the electronic pairing between the computing device and the electronic device may be established after transmission of the second identifier. This may be the case when, for example, the computing device and electronic device have not previously been paired. As will be described in more detail below, this situation may also occur when two different computing devices each share the same first identifier, and thus the electronic device initially attempts to pair with the wrong computing device after the first identifier is transmitted. Thus, though transmission of the second identifier takes more time, it may serve as a check to ensure that the electronic device has paired with the intended computing device.

As discussed above, once the pairing between the computing device and electronic device is established, the pairing relationship may enable ongoing unidirectional or bidirectional data exchange between the computing device and electronic device. This can take various suitable forms depending on the implementation. As non-limiting examples, media may be streamed from the computing device and played by the electronic device, or one device may transmit control inputs to the other—e.g., control inputs transmitted by the electronic device may be received by the computing device, or vice versa.

This is schematically illustrated in FIG. 3, in which the electronic device transmits control inputs 310 to the computing device after the pairing is complete. Such control inputs may take any suitable form. To reuse the example from FIG. 1, the control inputs may reflect the actuation state of a physical button of the electronic device—e.g., button 114 shown in FIG. 1. Thus, upon user actuation of the button, the electronic device may transmit a corresponding control input to the computing device—e.g., causing the computing device to launch a "home" interface. In a different example, the control inputs may cause the computing device to apply one or more settings specific to the electronic device, where such settings can include a preferred ink color, haptic feedback settings, a settings profile for a user ID associated with a user of the electronic device, etc.

Furthermore, in some examples, the control inputs received by the computing device from the electronic device may include instructions for synchronizing a frame timing cycle of the computing device with a frame timing cycle of the electronic device. For instance, the computing device may have an internal frame timing cycle governing activity of a touch-sensitive display on each time frame of the plurality of sequential time frames. Thus, at different times within each time frame, different display electrodes of the touch-sensitive display may be supplied with different signals—e.g., to provide touch sensing functionality at different regions on the display, or to electrostatically communicate with any paired electronic devices. To this end, the control inputs provided by the electronic device may synchronize the frame timing cycle of the electronic device with the frame timing cycle of the computing device. This may improve the accuracy of touch input detection at the computing device, and improve the efficiency of communication between the computing device and electronic device. Alternatively, synchronization of frame timing cycles may be governed by the computing device by sending suitable control inputs to the electronic device.

In general, a "control input" can take the form of any suitable data or computer-readable instruction that can affect the behavior of a paired computing device, and it will be understood that the specific examples described herein are non-limiting. Additionally, or alternatively, control inputs may be transmitted from the computing device to the electronic device to control operation of the electronic device in any suitable manner (e.g., to cause haptic feedback). Furthermore, it will be understood that, once a computing device and an electronic device are paired, any suitable data may be exchanged, and such data need not include control inputs.

Figure 5:
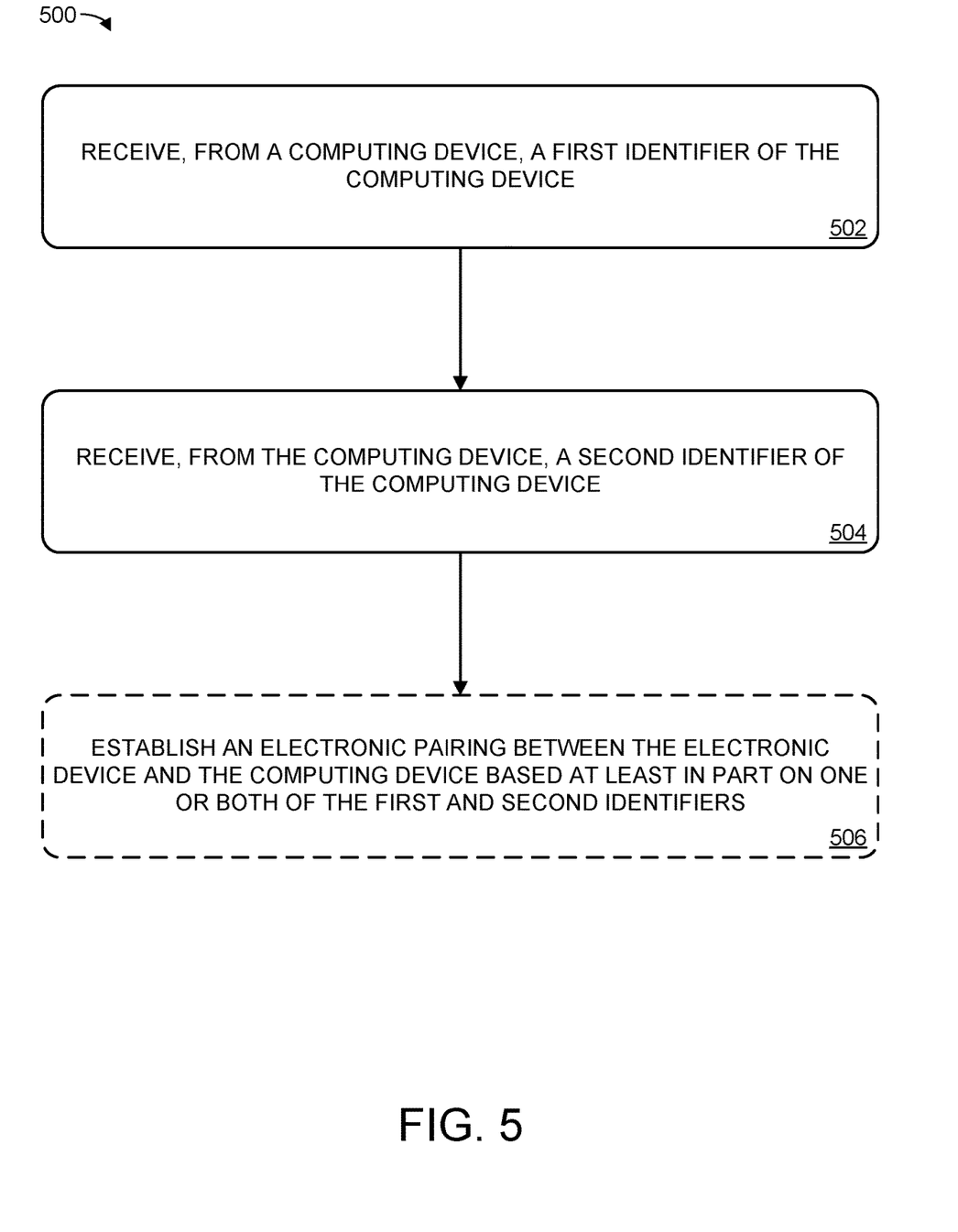
FIG. 5 illustrates an example method for electronic device pairing.

The present disclosure has thus far focused primarily on actions performed by the computing device. Turning now to FIG. 5, an example method 500 is illustrated that focuses on actions performed by an electronic device during pairing with a computing device. As with method 200, method 500 may be implemented by any suitable device, having any suitable capabilities, hardware configuration, and form factor. As non-limiting examples, method 500 may be implemented by electronic device 108 or computing system 700 described below with respect to FIG. 7.

At 502, method 500 includes receiving, from a computing device, a first identifier of the computing device. At 504, method 500 includes receiving, from the computing device, a second identifier of the computing device. At 506, method 500 includes establishing an electronic pairing between the electronic device and the computing device based at least in part on one or both of the first and second identifiers. Each of these steps may be performed substantially as described above with respect to FIGS. 2 and 3. Specifically, it will be understood that step 506 may begin either before or after receipt of the second identifier at step 504 of method 500. In general, any suitable data may be exchanged between the computing device and electronic device after the first identifier is received, and such data can include one or more identifiers of the electronic device, as one example.

Figure 6:
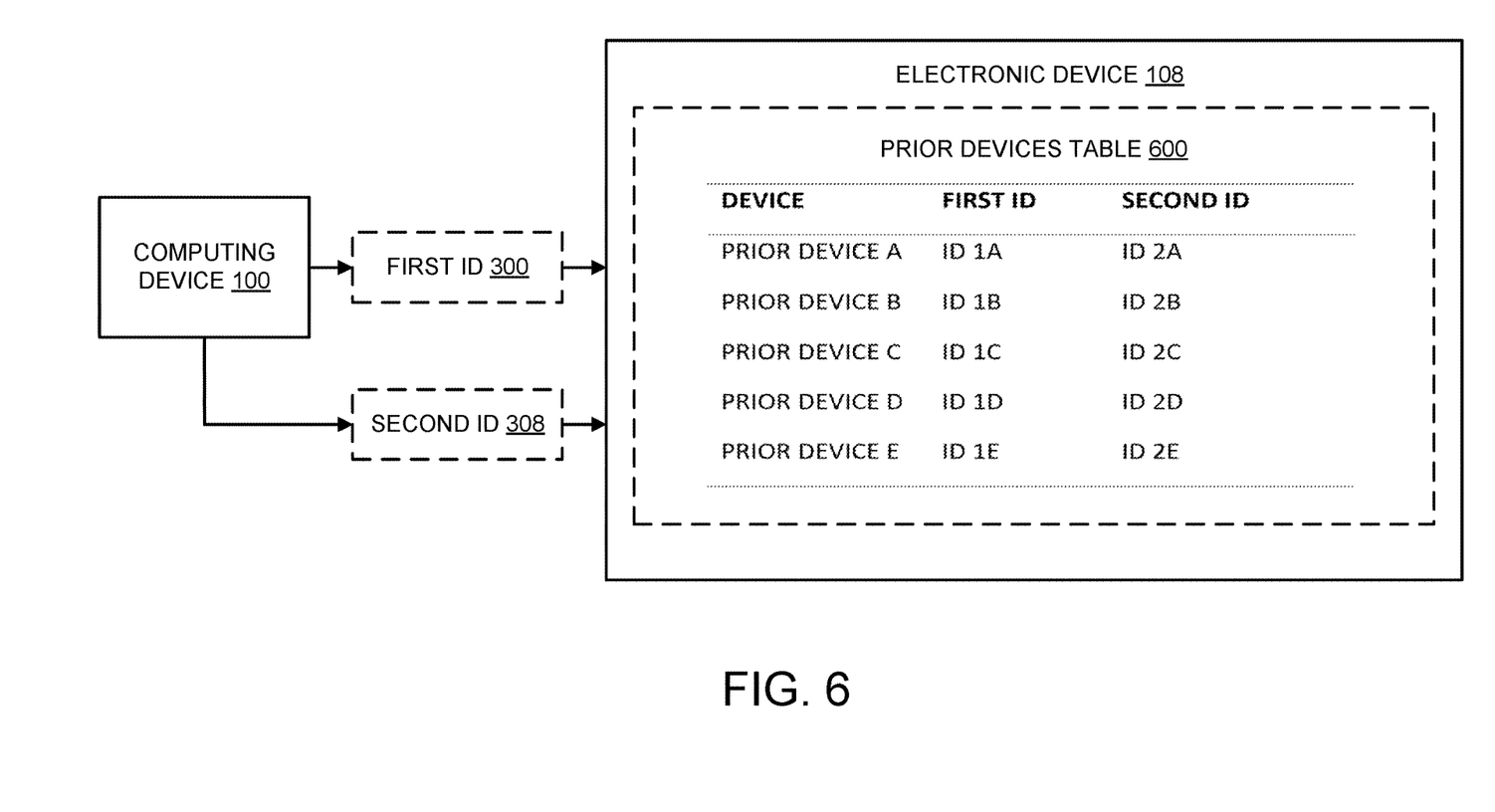
FIG. 6 schematically illustrates comparing identifiers received from a computing device to a stored table of prior identifiers.

However, after receiving the first identifier from the computing device, the electronic device may compare the first identifier to a stored table of prior first identifiers, corresponding to prior computing devices that the electronic device has previously paired with. This is schematically illustrated with respect to FIG. 6, again showing computing device 100 and electronic device 108. FIG. 6 also shows a prior devices table 600 stored by the electronic device, and listing a plurality of prior devices A-E that the electronic device has previously paired with. The prior devices table also includes, for each prior device, a prior first identifier and a prior second identifier corresponding to the device.

Furthermore, as shown in FIG. 6, electronic device 108 receives first identifier 300 and second identifier 308 from computing device 100, each of which may be compared to the various prior identifiers held in the stored table. In some examples, after determining that the stored table includes a selected prior identifier that matches the first identifier received from the computing device (e.g., first identifier 300), the electronic device may initiate pairing with the computing device based at least in part on the selected prior first identifier. When successful, this may result in relatively faster pairing between the computing device and electronic device than would be possible if pairing were solely based on the second identifier, which takes longer to transmit.

As discussed above, however, it is possible that in some cases, two different computing devices may each share the same first identifier. Thus, when the electronic device receives a first identifier from a computing device and matches the first identifier to a prior first identifier in the stored table, the electronic device may attempt to connect to an incorrect computing device, instead of the computing device that actually transmitted the first identifier. In some cases, this connection attempt may simply fail—e.g., because the prior computing device is not present in the same environment as the electronic device and is therefore unavailable for pairing. In the event that two different computing devices in the same environment share the same first identifier, the electronic device may initially pair with the incorrect computing device. In any case, after receiving the second identifier from the computing device, the electronic device may determine than an incorrect pairing was attempted, and instead establish an electronic pairing with the correct computing device. Furthermore, the electronic device may update the stored table with a new entry that includes the first and second identifiers.

In other words, the selected prior first identifier may be associated with a selected prior second identifier that also corresponds to a prior computing device that the electronic device has previously paired with. Upon receiving the first identifier from the computing device, and matching the first identifier to the selected first identifier held in the stored table, the electronic device may incorrectly attempt to pair with a prior computing device, rather than the computing device that actually transmitted the first identifier. However, receiving the second identifier from the computing device, the electronic device may determine that the second identifier does not match the selected prior second identifier in the stored table. The electronic device may then generate a new entry in the stored table for the computing device, the new entry including the first identifier and the second identifier.

In another example, the first identifier received from the computing device may not match any of the prior first identifiers in the stored table—e.g., in cases where the computing device and electronic device have not previously paired. Thus, upon determining that the first identifier received from the computing device does not match any of the prior first identifiers in the stored table, the electronic device may generate a new entry in the stored table for the computing device, the new entry including the first identifier and the second identifier.

The methods and processes described herein may be tied to a computing system of one or more computing devices. In particular, such methods and processes may be implemented as an executable computer-application program, a network-accessible computing service, an application-programming interface (API), a library, or a combination of the above and/or other compute resources.

Figure 7:
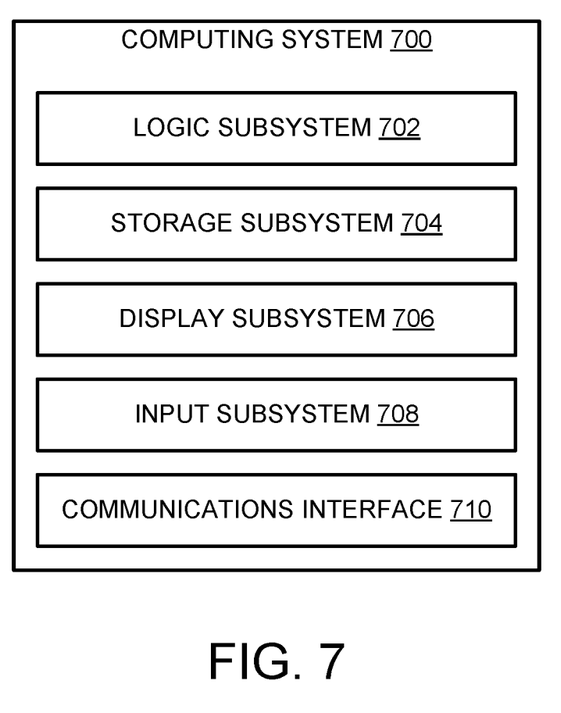
FIG. 7 schematically shows an example computing system.

FIG. 7 schematically shows a simplified representation of a computing system 700 configured to provide any to all of the compute functionality described herein. Computing system 700 may take the form of one or more personal computers, network-accessible server computers, tablet computers, home-entertainment computers, gaming devices, mobile computing devices, mobile communication devices (e.g., smart phone), virtual/augmented/mixed reality computing devices, wearable computing devices, Internet of Things (IoT) devices, embedded computing devices, and/or other computing devices.

Computing system 700 includes a logic subsystem 702 and a storage subsystem 704. Computing system 700 may optionally include a display subsystem 706, input subsystem 708, communication subsystem 710, and/or other subsystems not shown in FIG. 7.

Logic subsystem 702 includes one or more physical devices configured to execute instructions. For example, the logic subsystem may be configured to execute instructions that are part of one or more applications, services, or other logical constructs. The logic subsystem may include one or more hardware processors configured to execute software instructions. Additionally, or alternatively, the logic subsystem may include one or more hardware or firmware devices configured to execute hardware or firmware instructions. Processors of the logic subsystem may be single-core or multi-core, and the instructions executed thereon may be configured for sequential, parallel, and/or distributed processing. Individual components of the logic subsystem optionally may be distributed among two or more separate devices, which may be remotely located and/or configured for coordinated processing. Aspects of the logic subsystem may be virtualized and executed by remotely-accessible, networked computing devices configured in a cloud-computing configuration.

Storage subsystem 704 includes one or more physical devices configured to temporarily and/or permanently hold computer information such as data and instructions executable by the logic subsystem. When the storage subsystem includes two or more devices, the devices may be collocated and/or remotely located. Storage subsystem 704 may include volatile, nonvolatile, dynamic, static, read/write, read-only, random-access, sequential-access, location-addressable, file-addressable, and/or content-addressable devices. Storage subsystem 704 may include removable and/or built-in devices. When the logic subsystem executes instructions, the state of storage subsystem 704 may be transformed—e.g., to hold different data.

Aspects of logic subsystem 702 and storage subsystem 704 may be integrated together into one or more hardware-logic components. Such hardware-logic components may include program- and application-specific integrated circuits (PASIC/ASICs), program- and application-specific standard products (PSSP/ASSPs), system-on-a-chip (SOC), and complex programmable logic devices (CPLDs), for example.

The logic subsystem and the storage subsystem may cooperate to instantiate one or more logic machines. As used herein, the term "machine" is used to collectively refer to the combination of hardware, firmware, software, instructions, and/or any other components cooperating to provide computer functionality. In other words, "machines" are never abstract ideas and always have a tangible form. A machine may be instantiated by a single computing device, or a machine may include two or more sub-components instantiated by two or more different computing devices. In some implementations a machine includes a local component (e.g., software application executed by a computer processor) cooperating with a remote component (e.g., cloud computing service provided by a network of server computers). The software and/or other instructions that give a particular machine its functionality may optionally be saved as one or more unexecuted modules on one or more suitable storage devices.

When included, display subsystem 706 may be used to present a visual representation of data held by storage subsystem 704. This visual representation may take the form of a graphical user interface (GUI). Display subsystem 706 may include one or more display devices utilizing virtually any type of technology. In some implementations, display subsystem may include one or more virtual-, augmented-, or mixed reality displays.

When included, input subsystem 708 may comprise or interface with one or more input devices. An input device may include a sensor device or a user input device. Examples of user input devices include a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition.

When included, communication subsystem 710 may be configured to communicatively couple computing system 700 with one or more other computing devices. Communication subsystem 710 may include wired and/or wireless communication devices compatible with one or more different communication protocols. The communication subsystem may be configured for communication via personal-, local- and/or wide-area networks.

This disclosure is presented by way of example and with reference to the associated drawing figures. Components, process steps, and other elements that may be substantially the same in one or more of the figures are identified coordinately and are described with minimal repetition. It will be noted, however, that elements identified coordinately may also differ to some degree. It will be further noted that some figures may be schematic and not drawn to scale. The various drawing scales, aspect ratios, and numbers of components shown in the figures may be purposely distorted to make certain features or relationships easier to see.

In an example, a computing device comprises: a logic subsystem; and a storage subsystem holding instructions executable by the logic subsystem to: transmit a first identifier of the computing device to a separate electronic device, the first identifier being transmitted during one time frame of a plurality of sequential time frames; transmit a second identifier of the computing device to the electronic device, the second identifier including more data than the first identifier, the second identifier being transmitted over two or more time frames of the plurality of sequential time frames; and establish an electronic pairing between the computing device and the electronic device based at least in part on one or both of the first and second identifiers, the electronic pairing enabling receiving of control inputs from the electronic device at the computing device. In this example or any other example, the electronic pairing between the computing device and the electronic device is established after transmitting the first identifier and while at least a portion of the second identifier has yet to be transmitted. In this example or any other example, the computing device has previously been paired with the electronic device. In this example or any other example, the electronic pairing between the computing device and the electronic device is established after transmitting the second identifier. In this example or any other example, the first identifier is a 10-bit value. In this example or any other example, the first identifier is transmitted in response to detecting a proximity of the electronic device to the computing device. In this example or any other example, the instructions are further executable to repeatedly transmit the first identifier regardless of a proximity of the electronic device to the computing device. In this example or any other example, the instructions are further executable to receive an acknowledgement from the electronic device confirming receipt of the first identifier, and discontinue repeated transmission of the first identifier in response to the acknowledgement. In this example or any other example, the control inputs received by the computing device from the electronic device include instructions for synchronizing a frame timing cycle of the computing device with a frame timing cycle of the electronic device. In this example or any other example, the computing device includes a touch-sensitive display. In this example or any other example, the instructions are further executable to detect a proximity of the electronic device to the computing device by detecting a change in electrostatic properties of the touch-sensitive display consistent with the proximity of the electronic device. In this example or any other example, the electronic device is an active stylus.

In an example, an electronic device comprises: a logic subsystem; and a storage subsystem holding instructions executable by the logic subsystem to: receive, from a computing device, a first identifier of the computing device, the first identifier transmitted on one time frame of a plurality of sequential time frames of the computing device; receive, from the computing device, a second identifier of the computing device, the second identifier including more data than the first identifier, the second identifier being transmitted over two or more time frames of the plurality of sequential time frames; and establish an electronic pairing between the electronic device and the computing device based at least in part on one or both of the first and second identifiers, the electronic pairing enabling transmission of control inputs from the electronic device to the computing device. In this example or any other example, the instructions are further executable to, after receiving the first identifier from the computing device, compare the first identifier to a stored table of prior first identifiers corresponding to prior computing devices that the electronic device has previously paired with. In this example or any other example, the instructions are further executable to, upon determining that the stored table includes a selected prior first identifier that matches the first identifier received from the computing device, initiate pairing based at least in part on the selected prior first identifier. In this example or any other example, the selected prior first identifier is associated with a selected prior second identifier corresponding to the prior computing device that the electronic device has previously paired with, and the instructions are further executable to, upon determining that the second identifier received from the computing device does not match the selected prior second identifier, generate a new entry in the stored table for the computing device, the new entry including the first identifier and the second identifier. In this example or any other example, the instructions are further executable to, upon determining that the first identifier received from the computing device does not match any of the prior first identifiers in the stored table, generate a new entry in the stored table for the computing device, the new entry including the first identifier and the second identifier. In this example or any other example, the control inputs transmitted from the electronic device to the computing device include instructions for synchronizing a frame timing cycle of the electronic device with a frame timing cycle of the computing device. In this example or any other example, the electronic device is an active stylus.

In an example, a method for active stylus pairing comprises: detecting proximity of an active stylus to a computing device including a touch-sensitive display; responsive to detecting the proximity of the active stylus to the computing device, transmitting a first identifier of the computing device to the active stylus, the first identifier being transmitted during one time frame of a plurality of sequential time frames; transmitting a second identifier of the computing device to the active stylus, the second identifier including more data than the first identifier, the second identifier being transmitted over two or more time frames of the plurality of sequential time frames; and establishing an electronic pairing between the computing device and the active stylus based at least in part on one or both of the first and second identifiers, the electronic pairing enabling receiving of control inputs from the active stylus at the computing device.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing device, comprising:
a logic subsystem; and
a storage subsystem holding instructions executable by the logic subsystem to:
transmit a first identifier of the computing device to a separate stylus, the first identifier being transmitted during one time frame of a plurality of sequential time frames;
transmit a second identifier of the computing device to the stylus, the second identifier being transmitted over two or more time frames of the plurality of sequential time frames; and
establish an electronic pairing between the computing device and the stylus based at least in part on one or both of the first and second identifiers such that, in cases where the computing device has previously been paired with the stylus, the electronic pairing is established while at least a portion of the second identifier has yet to be transmitted, and in cases where the computing device has not previously been paired with the stylus, the electronic pairing is established after the second identifier is transmitted, wherein the electronic pairing enables receiving of control inputs from the stylus at the computing device.

2. The computing device of claim 1, wherein the first identifier is a 10-bit value.

3. The computing device of claim 1, wherein the first identifier is transmitted in response to detecting a proximity of the stylus to the computing device.

4. The computing device of claim 1, wherein the instructions are further executable to repeatedly transmit the first identifier regardless of a proximity of the stylus to the computing device.

5. The computing device of claim 4, wherein the instructions are further executable to receive an acknowledgement from the stylus confirming receipt of the first identifier, and discontinue repeated transmission of the first identifier in response to the acknowledgement.

6. The computing device of claim 1, wherein the control inputs received by the computing device from the stylus include instructions for synchronizing a frame timing cycle of the computing device with a frame timing cycle of the stylus.

7. The computing device of claim 1, wherein the computing device includes a touch-sensitive display.

8. The computing device of claim 7, wherein the instructions are further executable to detect a proximity of the stylus to the computing device by detecting a change in electrostatic properties of the touch-sensitive display consistent with the proximity of the stylus.

9. A stylus, comprising:
a logic subsystem comprising one or more processors; and
a storage subsystem holding instructions executable by the one or more processors to:
receive, from a computing device, a first identifier of the computing device, the first identifier transmitted on one time frame of a plurality of sequential time frames of the computing device;
receive, from the computing device, a second identifier of the computing device, the second identifier being transmitted over two or more time frames of the plurality of sequential time frames; and
establish an electronic pairing between the stylus and the computing device based at least in part on one or both of the first identifier and the second identifier such that, in cases where the stylus has previously been paired with the computing device, the electronic pairing is established after receiving the first identifier and while at least a portion of the second identifier has yet to be received, and in cases where the stylus has not previously been paired with the computing device, the electronic pairing is established after the first identifier and the second identifier are received, wherein the electronic pairing enables transmission of control inputs from the stylus to the computing device.

10. The stylus of claim 9, wherein the instructions are further executable to, after receiving the first identifier from the computing device, compare the first identifier to a stored table of prior first identifiers corresponding to prior computing devices that the stylus has previously paired with.

11. The stylus of claim 10, wherein the instructions are further executable to, upon determining that the stored table includes a selected prior first identifier that matches the first identifier received from the computing device, initiate pairing based at least in part on the selected prior first identifier.

12. The stylus of claim 11, wherein the selected prior first identifier is associated with a selected prior second identifier corresponding to the prior computing device that the stylus has previously paired with, and the instructions are further executable to, upon determining that the second identifier received from the computing device does not match the selected prior second identifier, generate a new entry in the stored table for the computing device, the new entry including the first identifier and the second identifier.

13. The stylus of claim 10, wherein the instructions are further executable to, upon determining that the first identifier received from the computing device does not match any of the prior first identifiers in the stored table, generate a new entry in the stored table for the computing device, the new entry including the first identifier and the second identifier.

14. The stylus of claim 9, wherein the control inputs transmitted from the stylus to the computing device include instructions for synchronizing a frame timing cycle of the stylus with a frame timing cycle of the computing device.

15. A method for active stylus pairing, the method comprising:
detecting proximity of an active stylus to a computing device including a touch-sensitive display;
responsive to detecting the proximity of the active stylus to the computing device,
transmitting a first identifier of the computing device to the active stylus, the first identifier being transmitted during one time frame of a plurality of sequential time frames;
transmitting a second identifier of the computing device to the active stylus, the second identifier being transmitted over two or more time frames of the plurality of sequential time frames; and
establishing an electronic pairing between the computing device and the active stylus based at least in part on one or both of the first and second identifiers such that, in cases where the computing device has previously paired with the active stylus, the electronic pairing is established while at least a portion of the second identifier has yet to be transmitted, and in cases where the computing device has not previously been paired with the active stylus, the electronic pairing is established after the second identifier is transmitted, wherein the electronic pairing enables receiving of control inputs from the active stylus at the computing device.

* * * * *